United States Patent
Chang et al.

(10) Patent No.: US 6,859,228 B1
(45) Date of Patent: *Feb. 22, 2005

(54) LEAST SQUARES METHOD FOR COLOR MISREGISTRATION DETECTION AND CORRECTION IN IMAGE DATA

(75) Inventors: William Ho Chang, Vancouver, WA (US); Makoto Otsu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,602

(22) Filed: Oct. 18, 1999

(51) Int. Cl.$^7$ .......................... H04N 9/093; G06K 9/00
(52) U.S. Cl. ..................................... 348/263; 382/162
(58) Field of Search ............................ 348/263, 241, 348/269, 270; 382/162–167; 358/1.9, 3, 26, 505, 461, 512, 520, 521, 518, 530, 540; 345/611

(56) References Cited

U.S. PATENT DOCUMENTS

| | | | |
|---|---|---|---|
| 4,583,116 A | | 4/1986 | Hennig et al. |
| 5,475,428 A | * | 12/1995 | Hintz et al. ................. 348/263 |
| 5,477,335 A | | 12/1995 | Tai |
| 5,485,203 A | * | 1/1996 | Nakamura et al. .......... 348/263 |
| 5,500,746 A | | 3/1996 | Aida |
| 5,668,931 A | * | 9/1997 | Dermer ....................... 358/1.9 |
| 5,737,003 A | | 4/1998 | Moe et al. |
| 5,760,815 A | | 6/1998 | Genovese |
| 5,764,388 A | | 6/1998 | Ueda et al. |
| 5,774,156 A | | 6/1998 | Guerin |
| 5,907,414 A | | 5/1999 | Hiratsuka |
| 6,088,475 A | * | 7/2000 | Nagashima et al. ........ 382/162 |
| 6,272,239 B1 | * | 8/2001 | Colla et al. ................. 382/167 |
| 6,345,117 B2 | * | 2/2002 | Klassen ....................... 382/167 |
| RE37,940 E | * | 12/2002 | Imao et al. ................... 358/1.9 |
| 6,556,313 B1 | * | 4/2003 | Chang et al. ................. 358/1.9 |

* cited by examiner

Primary Examiner—Ngoc-Yen Vu
Assistant Examiner—Luong T Nguyen
(74) Attorney, Agent, or Firm—Marger Johnson & McCollom, P.C.

(57) ABSTRACT

A method for color misregistration detection. Input image data is buffered and transferred to vector space. An examination window for a current pixel is established and foreground and background pixels within that window are selected. The current pixel is examined to determine if it is in an edge of a scanned object. If the current pixel is in an edge, it is deemed to have color misregistration. For pixels that have been deemed to have color misregistration, a correction value is determined and then adjusted prior to being applied to the pixel value.

9 Claims, 1 Drawing Sheet

LEAST SQUARES METHOD FOR COLOR MISREGISTRATION DETECTION AND CORRECTION IN IMAGE DATA

BACKGROUND OF THE INVENTION

1. Field of the Invention

This invention relates to methods of image capture, more particularly for methods of detecting color misregistration in image capture devices.

2. Background of the Invention

Color image capture devices typically operate by capturing primary color component signals such as red, green and blue (RGB) from a set of charge coupled devices (CCDs). The CCDs are normally arranged in the main scan direction. The sub-scan direction, the direction in which the scanning bar moves, will be referred to as the Y direction and the main scan direction, perpendicular to the sub-scan direction, will be referred to as X.

These CCDs capture the image in one pass or in three passes, one for each primary color component. Regardless of the number of passes, however, there is typically some misalignment in the RGB signals. This misalignment between colors is referred to as color misregistration. It is caused by faulty superposition of the three colors. It normally manifests itself as color fringes on the edges of the objects that were scanned, either text, graphics or drawings.

Color fringes normally appear as either cyan or magenta fringes on the edges of the scanned objects. Cyan fringes result from misregistration of the red signal, and magenta fringes result from misregistration of the green signal. The human eye does not normally detect misregistration of the blue signal, because of its low bandwidth and low contrast sensitivity.

Most often, color misregistration occurs in the Y direction. Vibration, scanning motion and the mechanical or optical design of the scanner can lead to faulty superposition of the three-color components. Several different approaches have been taken to solve this problem.

For example, some efforts have been directed at correcting the mechanical problems in the scanner by tracking registration marks. One example of these types of techniques is found in U.S. Pat. No. 5,737,003, issued on Apr. 7, 1998. In this patent, a laser scanner used to form latent images on the photoconductive belt is used to detect the position of the edge of the belt. The belt is then controlled to reduce the deviation of the belt from its path. It also includes a method for controlling the laser, and therefore the formation of the image, based upon the position of the belt.

Another of these mechanical registration techniques is found in U.S. Pat. No. 5,774,156, issued Jun. 30, 1998. The system uses several stations, one for each color of toner. The latent image formed by the individual scanners at the stations includes a registration area. The registration area is then aligned prior to the application of the toner. The registration area is then recharged to avoid having the registration marks attract any toner. This is repeated at each station to ensure proper positioning of the image before the latent image for the next color is formed.

U.S. Pat. No. 5,760,815, issued Jun. 2, 1998, shows another method. In this patent, a fiber optic detection means is used to detect registration signals produced by a retroreflector. The light from the retroreflector is analyzed and used to adjust the registration of the belt.

Other methods have focused on optical means to correct the misregistration. An example of these types of techniques can be found in U.S. Pat. No. 4,583,116, issued Apr. 15, 1986. In this patent, the color signals are manipulated to convert them into color separation signals for cyan, magenta, yellow and black. The edges of each of the colors is then detected and manipulated to switch lighter areas with darker areas, or vice versa, to avoid streaks and other imperfections.

Several other types of techniques are used to detect color misregistration at the data level. Examples of these are found in U.S. Pat. Nos. 5,500,746, 5,907,414, 5,477,335, and 5,764,388. In U.S. Pat. No. 5,500,746, issued Mar. 19, 1996, the signals are manipulated to ensure that the dots formed are in line both in the X and Y directions for each color. The dots are resampled and repositioned as determined by line correction devices.

In U.S. Pat. No. 5,907,414, issued May 25, 1999, one of the more powerful prior art methods is shown. An image sensor used to scanning a manuscript generates signals and these signals are examined. If the examination of the signals determines that the pixel exists at an edge of a letter image, it is identified as such. These identified pixels are then adjusted in their brightness relative to the green plane to ensure a smooth edge that was disrupted by vibration of the image sensor.

A less sophisticated but still useful technique is shown in U.S. Pat. No. 5,764,388, issued Jun. 9, 1998. In this patent, the cyan-magenta-yellow components of a pixel are analyzed. If the chrominance of the signal is less than a threshold, it is set to zero to offset an assumed color misregistration error.

The current state of the art, as demonstrated above, has several limitations in the color misregistration area. The techniques are inaccurate and are not adaptive to local conditions in the amount of color misregistration detected. Typically, only one threshold level is used to determine whether the pixel suffers from misregistration, which then causes the correction to be applied. These processes are very susceptible to wrong detection or overcorrection, degrading image quality and losing image information. Sharp transitional artifacts can appear in the image where corrected pixels lie next to uncorrected pixels.

Therefore, a method is needed that detects and corrects color misregistration more reliably and applies necessary corrections in a more accurate manner.

SUMMARY OF THE INVENTION

One aspect of the invention is a method for detecting color misregistration in image data. Input image data is buffered as color space data. The color space data is then transferred to vector space. An examination window around a current pixel is established. Background and foreground pixels in this window are determined. The current pixel is examined to determine if it is on an edge of a scanned object, either text, image or graphic. If the pixel meets all these requirements it is deemed to have color misregistration. A correction value is then determined and adjusted before being applied to the pixel value. The correction value can be determined using normal least squares. It can be adjusted by the application of fuzzy logic.

Other aspects of the invention include the above method with an optional edge detection step that occurs before any detailed analysis is performed. This initial sorting can speed the process by narrowing the number of pixels that need to undergo the detailed analysis.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Vector-based analysis of color misregistration performs color misregistration detection using vector manipulation in RGB color space. However, it is possible that this vector manipulation could be performed in the cyan-magenta-yellow (CMY) or cyan-magenta-yellow-black (CMYK) color space as well. However, as the intent of this invention is analysis upon color capture from an image capture device, and these devices typically use RGB color space, the discussion of this invention will focus on RGB color space. However, that is in no way intended to limit applicability of this invention.

Figure 1:
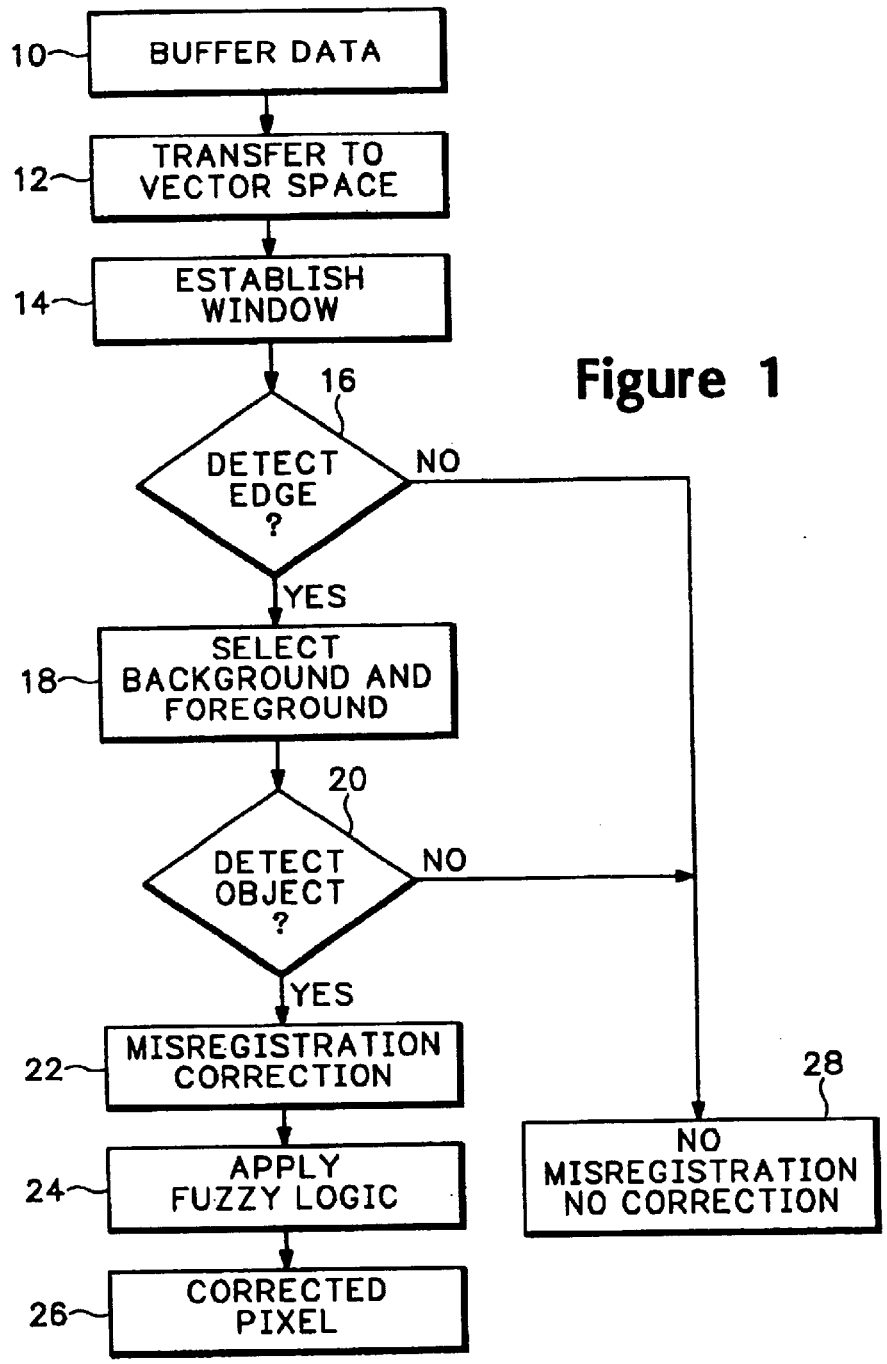
FIG. 1 shows a flowchart of one embodiment of a method for detecting color misregistration in accordance with the invention.

FIG. 1 shows a flow chart of one embodiment of a process for detection of color misregistration in accordance with the invention. In step 10, the input data is received from the color image capture device, typically RGB data. The data is digitized and buffered. For purposes of this discussion, the data is assumed to be digitized at eight bits per color. This data is then processed in RGB vector space in a color misregistration detection circuitry or process. The invention could be implemented as software or in hardware.

In step 12, the line selected in step 10 is then transferred to vector space. The vector space uses two color pixels, which will be referred to as pixel A and pixel B. The two color vectors have the following notation:

$$P_A = (R_a, G_a, B_a); \text{ and } P_B = (R_b, G_b, B_b).$$

The gradient between the two pixels to be $$d_{ab} = (d_{RAB}, d_{GAB}, d_{BAB}), \text{ and its magnitude is } D_{AB} = \text{magnitude}(d_{AB}).$$

Figure 2:
FIG. 2 shows a schematic representation of a pixel layout in the sub-scan direction, in accordance with the invention.

Once the initial data for the RGB color space is buffered and transferred to the vector space, several steps can be performed that will narrow the possible pixels with color misregistration. Prior to performing any of these steps, however, an examination area or window of interest must be established as shown in step 14. The variations of size and direction of this window is left to the designer. For purposes of the discussion only, a window of 5 pixels by 1 pixel will be assumed. A schematic representation of this type of window is shown in FIG. 2.

The pixel of interest is pixel 0. Two pixels on either side, before (−) and after (+) the pixel of interest are used in the analysis. In this example, these 5 pixels are in the sub-scan, or Y, direction. Only one pixel width is used in the scan direction. As has been mentioned, the dimensions of the window are left up to the designer.

Having established the window of pixels to be examined around the pixel of interest, it is now possible to quickly determine whether detailed analysis of that pixel is necessary. In step 16 of the process shown in FIG. 1, the pixel is analyzed to determine whether or not it is on an edge. Edge detection may be performed in many ways. For example, a Sobel filter or a gradient filter may be used.

However, in the instant invention, a special gradient edge detector can also be used. Using the window established in step 16, gradients between the pixel of interest and its neighbors are determined. If the gradients fall below a predetermined threshold, no edge is detected. Since color misregistration typically occurs at the edges of scanned objects, such as text, drawings or images, pixels not on an edge are not considered to be candidates for color misregistration. If the result of edge detection at step 16 is negative, the process continues to step 28 and ends with respect to that pixel.

It must be noted that step 16 performs only an initial determination of edge detection. A much more detailed analysis is performed further in the process. Step 16 is an optional step, which can speed the process by further narrowing the pixels upon which more advanced computations must be performed.

If the result of edge detection in step 16 is positive, the process moves on to step 18 to differentiate between foreground pixels and background pixels. Again, there are several options for this determination. However, for this discussion, one of two approaches will be discussed. The pixels within the window are analyzed to determine darkest or lightest pixels. Alternatively, the pixels could be compared against a predetermined pattern. Further in the process, the current pixel will be analyzed in comparison to the foreground and background, so the identification of these components of the image is important.

Once the determination of foreground or background is made, the process moves to object detection at step 20. As discussed above, scanned objects can include text characters, drawings or images. The edges of any of these objects are candidates for color misregistration. Again, there are several methods for determining if a pixel is part of a scanned object or not.

For purposes of this discussion, a two-step method will be used for step 20 of the process. The first step will be to check the gradient of the pixel of interest. To be in the edge of an object, the gradient between the foreground and background must be higher than the gradients between the current pixel and the background, and the current pixel and the foreground. Pixel 0 is the designation of the current pixel under study. Using D as the magnitude of the gradients, and a and b for foreground and background:

$$D(a,b) > D(a,0); \text{ and } D(a,b) > D(b,0).$$

In addition to the gradient check, a luminance check may also be performed. Some approximation is used to convert the foreground (a), background (b), and current pixel (0) to luminance values. One example of such a conversion is shown below using the foreground values:

$$L(a) = 0.5G(a) + 0.3R(a) + 0.2B(a).$$

To be in the edge of an object, the luminance of the current pixel must be between the foreground and background luminance values.

$$L(b) < L(0) < L(a); \text{ or, } L(a) < L(0) < L(b).$$

If the results of this step are positive, and the pixel is in the edge of a scanned object, then the process continues on to step 22. If the results are negative, this pixel is eliminated as a candidate for color misregistration. The process will continue to step 28 and ends with regard to this pixel.

This narrowing process of eliminating pixels that are not good candidates for color misregistration helps speeds the process. Only pixels that are good candidates undergo detailed analysis. This detailed analysis is performed at step 22.

At this point in the process, the pixel is deemed to be a pixel with color misregistration. At step 22, linear interpolation and normal least square projection is used to find the optimum correction point. Linear interpolation is accomplished by linearly connecting the foreground pixel $P_a$ and the background pixel $P_b$ discussed with reference to step 18. For example, a straight line connecting pixels a and b can be represented by:

$$\text{Line}(a,b): (R-R_a)/(R_b-R_a)=(G-G_a)/(G_b-G_a)=(B-B_a)/(B_b-B_a).$$

It must be noted that many other types of interpolation exist and are equally applicable. Some may result in equal or better performance in different circumstances.

The purpose of using least square projection is to find a point in the interpolation line that contains minimum energy to the current pixel $P_0$. The normal least square projection can be represented by:

$$\text{Minimize}(\text{Distance}(P_0-\text{Line}(a,b))^2.$$

This embodiment uses the normal least square approach, which is different from the traditional least square. In normal least square, the projection direction is perpendicular to the object and is independent of the coordinate system used. The normal least square projection is independent of the rotation in the coordinate system or the rotation of the object. It is also independent of the pixel values used in the current projection and interpolation for $P_0$, $P_a$, or $P_b$.

The above equation can be solved in several different ways, including analytical geometry, vector calculus, linear algebra, or other optimization techniques. For example, the above equation could be solve by parameterizing the equation for Line(a,b) in t, using:

$$\text{Line}(t)=(P_b-P_a)t+P_a.$$

This equation is then substituted in to the normal least squares equation above, which will find the value t corresponding to the projection point in the least squares approach. This value can then be used as the correction value for each color fringing pixel.

Once the color correction value is determined in step 22, the value is adjusted using fuzzy logic in step 24. Fuzzy logic is a methodology developed by Professor Lotfi A. Zadeh at the University of California at Berkeley in 1965. It is used generally to describe a tool that allows intermediate values to be defined inside the range of conventional evaluations such as ON/OFF, YES/NO. The approach allows these intermediate values to be formulated mathematically and then processed by computers.

As applied in this embodiment, fuzzy logic results in varying the degree of correction applied to a pixel with color misregistration, beyond the current approach in the art of either correcting or not correcting a particular pixel. Merely as an example, the fuzzy logic could be applied in the following manner.

If the contrast of the gradient between the foreground and background is high, then the amount of correction is high. If the contrast between the foreground and background is low, then the amount of correction is low. This determination could be made using the most simple linear fuzzy approximation, or triangular function. The complexity of the fuzzy logic applied is only constrained by the selections of the system design and the system operating conditions.

A second fuzzy objective could then take into account how closely a current pixel $P_0$ is to either the foreground or background. If it is close enough and indicates a borderline condition, the amount of correction is reduced. This could be implemented by using a step function to cut the correction factor in half in locations by the borderline. The exact designation of what constitutes a borderline condition can be adjusted to fit a particular system or application during implementation. These objectives are merely for demonstrative purposes and are not intended to limit the applicability of multivalued determinations to any particular set of objectives.

Preferably, the above process is implemented in software in the image capture device. It is possible that it could be implemented in the image output device that receives the image data from the image capture device. It could also be implemented in either part of a device that performs both image capture and image output. This process could be implemented in image or graphic application software, Raster Image Processors (RIP), or printer, copier or output device drivers, among others.

Alternately, the process could be implemented in application specific integrated circuits (ASIC), field programmable gate arrays (FPGA) or in digital signal processors (DSP). However, these hardware implementations are not as flexible, so the software embodiments are preferred.

As mentioned previously, this process could be applied to color spaces other than RGB. It could be implemented in CMY, CMYK and chrominance and luminance based color spaces, such as LAB, LCH, HLS, etc. None of the above specifics or examples are intended to limit applicability of the invention.

Thus, although there has been described to this point a particular embodiment for a method and apparatus for color misregistration correction, it is not intended that such specific references be considered as limitations upon the scope of this invention except in-so-far as set forth in the following claims.

What is claimed is:

1. A method for detecting and correcting color misregistration of input images, the method comprising:
   buffering image data received from an image capture device in the form of color space data;
   transferring said color space data to vector space;
   establishing a window around and including a current pixel;
   selecting foreground and background pixels in said window;
   determining if said current pixel is in an edge of an object by determining if a gradient between the foreground pixel and the background pixel is higher than a gradient between the current pixel and the foreground pixel and a gradient between the current pixel and the background pixel;
   designating said current pixel as having color misregistration if said current pixel is in an edge of an object;
   determining a correction value by applying normal least square projection to said current pixel;
   adjusting the correction value for said current pixel having color misregistration; and
   applying said correction value to said current pixel having color misregistration.

2. The method as claimed in claim 1 wherein said method further includes initially determining if a pixel is on an edge, occurring before establishing a window.

3. The method as claimed in claim 1 wherein establishing a window further comprises establishing a window of 5 pixels in the sub-scan direction and 1 pixel in the main scan direction.

4. The method as claimed in claim 1, wherein determining if said current pixel is in an edge further comprises a luminance check on said current pixel.

5. The method as claimed in claim 1, wherein adjusting further comprises applying fuzzy logic to said correction value to adjust said correction value.

6. The method as claimed in claim 1, wherein said color space is RGB.

7. The method as claimed in claim 1, wherein said color space is CMY.

8. The method as claimed in claim 1, wherein said color space is CMYK.

9. The method as claimed in claim 1, wherein said color space is a luminance and chrominance color space.

* * * * *